(12) United States Patent
Chiu

(10) Patent No.: US 9,016,179 B2
(45) Date of Patent: Apr. 28, 2015

(54) POSITIONING DEVICE FOR A TURNABLE TABLE OF SAW MACHINE

(71) Applicant: Rexon Industrial Corp., Ltd., Taichung (TW)

(72) Inventor: Cheng-Hung Chiu, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 239 days.

(21) Appl. No.: 13/710,790

(22) Filed: Dec. 11, 2012

(65) Prior Publication Data

US 2013/0160628 A1    Jun. 27, 2013

(30) Foreign Application Priority Data

Dec. 26, 2011    (TW) .............................. 100148603 A

(51) Int. Cl.
| | |
|---|---|
| B27B 5/36 | (2006.01) |
| B23D 45/04 | (2006.01) |
| B23D 47/02 | (2006.01) |
| B23D 47/00 | (2006.01) |
| B27B 5/29 | (2006.01) |

(52) U.S. Cl.
CPC . *B23D 47/02* (2013.01); *B27B 5/36* (2013.01); *B23D 47/00* (2013.01); *B27B 5/29* (2013.01)

(58) Field of Classification Search
CPC ........... B27B 5/20; B27B 5/36; B23D 45/044
USPC ...................... 83/490, 471.3, 486.1
See application file for complete search history.

(56) References Cited

U.S. PATENT DOCUMENTS

| | | | | |
|---|---|---|---|---|
| 5,862,732 A | * | 1/1999 | Itzov ............................ | 83/471.3 |
| 6,016,732 A | * | 1/2000 | Brault et al. .................. | 83/471.3 |
| 2009/0205474 A1 | * | 8/2009 | Liu et al. .................... | 83/435.13 |

* cited by examiner

*Primary Examiner* — Kenneth E. Peterson
*Assistant Examiner* — Nhat Chieu Do
(74) *Attorney, Agent, or Firm* — Bacon & Thomas, PLLC

(57) ABSTRACT

A positioning device for a turnable table of a saw machine having a pivot shaft that pivotally connects a pair of clamping units. A pressing member with an attachment portion for attaching to a coupling unit may be formed on each clamping unit. By manipulating a trigger of the coupling unit, the pair of clamping units can be driven to rotate a pair of corresponding clench members for selectively clamping or unclamping a base of the saw machine. Thereby, the turnable table can be secured in place upon adjustment.

20 Claims, 12 Drawing Sheets

US 9,016,179 B2

POSITIONING DEVICE FOR A TURNABLE TABLE OF SAW MACHINE

CROSS REFERENCE TO RELATED APPLICATION(S)

This application claims, under 35 U.S.C. §119, priority to Taiwanese Application No. 100148603, filed Dec. 26, 2011, which application is hereby incorporated by reference in its entirety, inclusive of the specification, claims, and drawings.

FIELD OF THE INVENTION

The present disclosure relates to a machine tool, and more specifically, to a positioning device for a turnable table of a saw machine.

BACKGROUND

Referring to FIG. 1, a conventional saw machine is shown which includes a base 1, a worktable 2 rotatably disposed thereon, a cutting unit 3 which is coupled to the worktable 2, and a positioning unit 4. The base 1 comprises a base plate 101 and two support legs 102 which are laterally mounted to the base plate 101. The positioning unit 4 comprises a rotatable shaft 401 which is threadedly secured to the worktable 2. By rotatably loosening the rotatable shaft 401 of the positioning unit 4, the worktable 2 along with the cutting unit 3 are rotatable relative to the base plate 101, when the worktable 2 and the cutting unit 3 are rotated to a desired position, a user tightens the rotatable shaft 401 such that a cutting angle of the cutting unit 3 can be adjusted.

Although the cutting angle of the cutting unit 3 can be adjusted and positioned by utilizing the positioning unit 4, it is difficult for the user to visually observe whether the positioning unit 4 has been securely positioned; in addition, when the worktable 2 along with the cutting unit 3 are rotated relative to the base 1, an end section of the rotatable shaft 401 may frictionally contact against a periphery of the base plate 101, which may lead to undesirable scratch marks on the periphery of the base plate 101. Furthermore, because the positioning unit 4 solely relies on the rotatable shaft 401 for positioning the worktable 2 relative to the base 1, the rotatable shaft 401 may be over tightened when it is manually adjusted, which can cause deformation of the base plate 101. On the contrary, when the rotatable shaft 401 is not properly tightened, the worktable 2 may not be securely positioned.

SUMMARY

The present invention has been accomplished under the following circumstances. It is therefore an object of the present invention to provide a positioning device for a turnable table of a saw machine which is easy to operate, can be firmly positioned, and would not leave undesirable scratch marks or cause deformation to the base plate of the saw machine.

To achieve these and other objects of the present disclosure, the positioning device for a turnable table of a saw machine in accordance with the present disclosure comprises a base which has a top surface and a bottom surface, a turnable table which is rotatably disposed on the base, and a cutting unit disposed on the turnable table. The positioning device comprises a pivot shaft which may be mounted to the turnable table; a first pressing member which is pivotally coupled to the pivot shaft; a second clamping unit which has a second pivot portion formed thereon for pivotally coupling with the pivot shaft; and a second clench member and a second pressing member that oppositely extend from the second pivot portion. The second clench member corresponds to the bottom surface of the base and the second pressing member corresponds to the first pressing member. A coupling unit may be interposed between the first pressing member and the second pressing member. The coupling unit includes a first coupling member pivotally connected to the first pressing member, and a second coupling member for pivotally interconnecting the first coupling member and the second pressing member.

A trigger may be coupled to the second coupling member. By manipulating the trigger, the first and second pressing members can be drawn toward/away from each other. In particular, the second clench member is driven by the second pressing member to unclamp the base when the first and second pressing members are drawn toward each other. Further, the second clench member securely clamps the base when the first and second pressing members are drawn away from each other.

In view of the above, by manipulating the trigger of the coupling unit, the first pressing member and the second pressing member may be easily manipulated in an orientation toward or away from each other so that the second clench member can unclamp or clamp the base unit. Therefore, the present invention can be firmly positioned, without leaving undesirable scratch marks or causing deformation to the base plate of the saw machine.

BRIEF DESCRIPTION OF THE DRAWINGS

These and other features, aspects, and advantages of the present disclosure will become better understood with regard to the following description, appended claims, and accompanying drawings.

Figure 1:
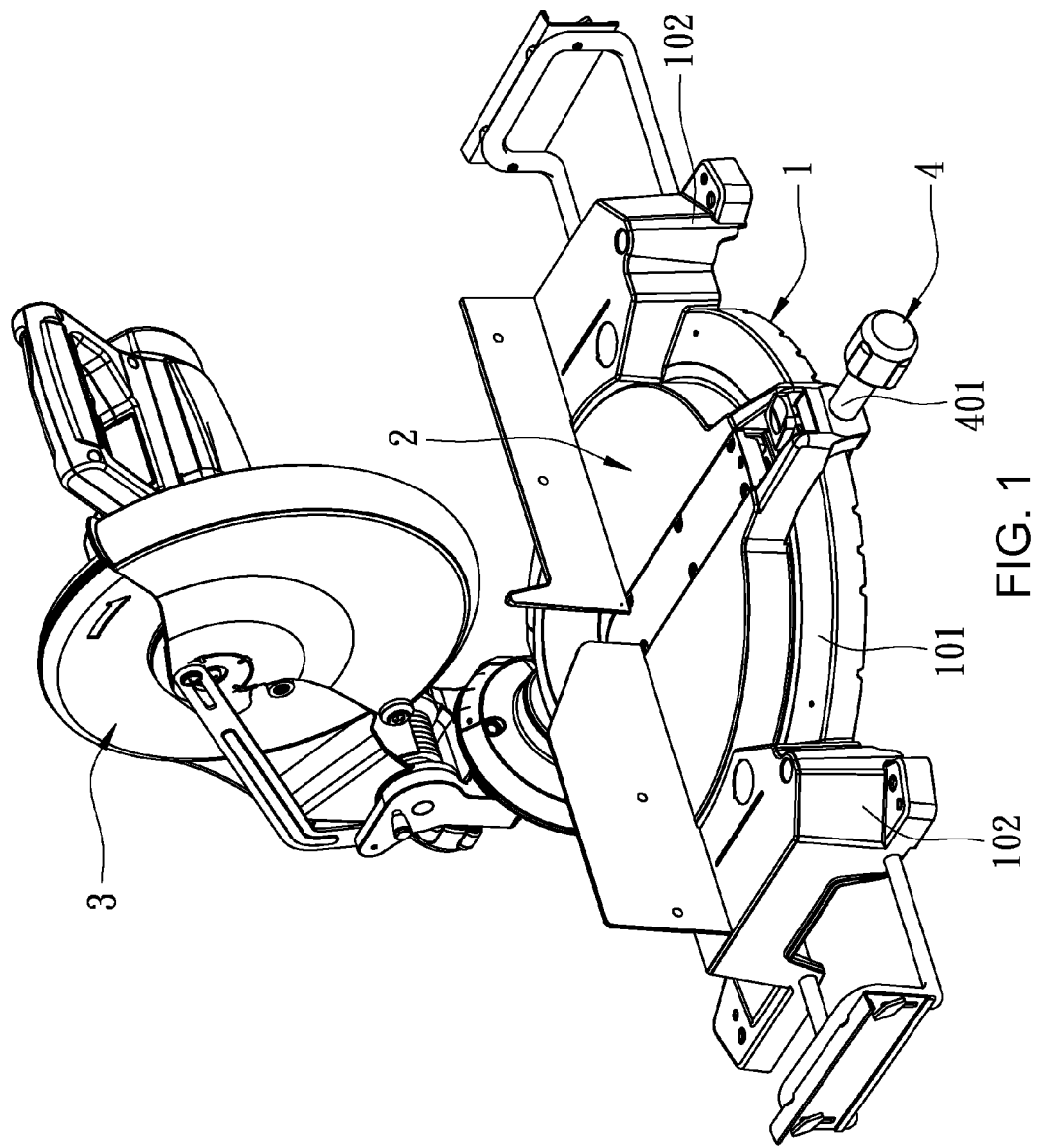
FIG. 1 is a perspective view of a conventional sawing machine.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a positioning device and the components thereof, and in no way limit the structures or configurations of the positioning device and components thereof according to the present disclosure.

DETAILED DESCRIPTION OF VARIOUS EMBODIMENTS

A better understanding of different embodiments of the invention may be had from the following description read in conjunction with the accompanying drawings in which like reference characters refer to like elements.

While the disclosure is susceptible to various modifications and alternative constructions, certain illustrative embodiments are shown in the drawings and are described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure.

It will be understood that, unless a term is expressly defined in this disclosure to possess a described meaning, there is no intent to limit the meaning of such term, either expressly or indirectly, beyond its plain or ordinary meaning.

Figure 2:
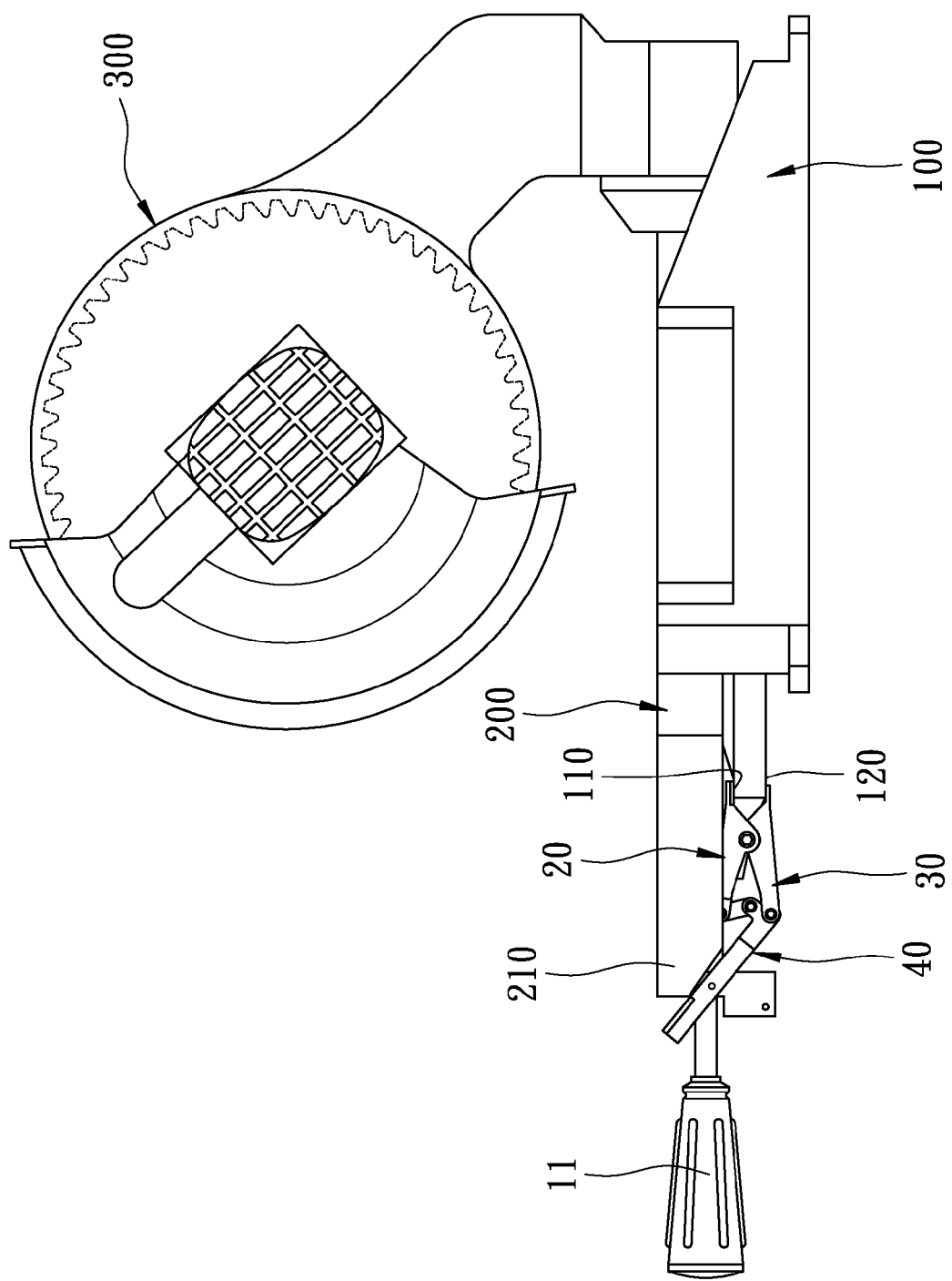
FIG. 2 is an assembled side elevation view of a positioning device for a turnable table of saw machine in accordance with a first embodiment of the present disclosure.
Figure 3:
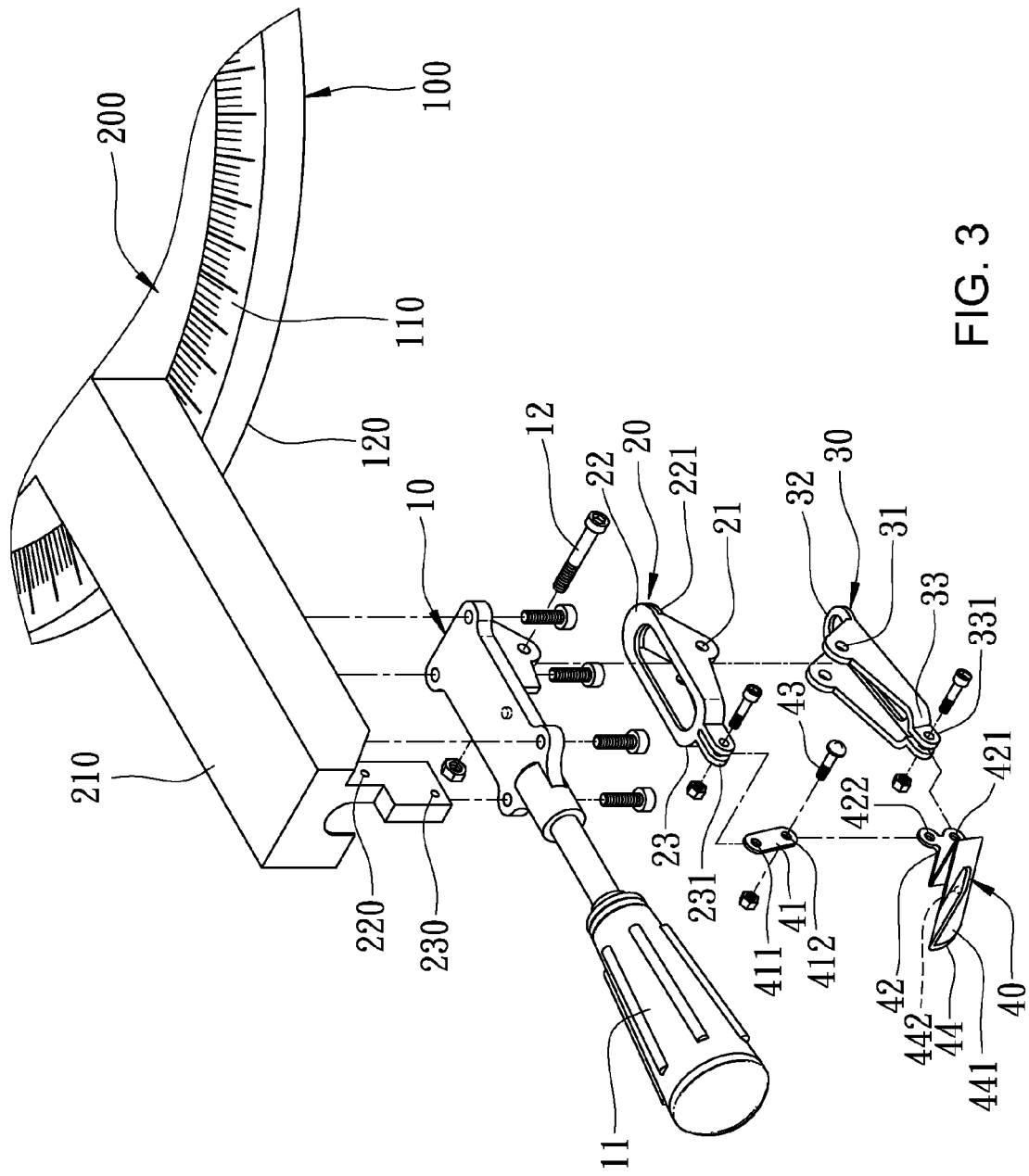
FIG. 3 is an exploded perspective view of the positioning device for a turnable table of a saw machine in accordance with the first embodiment of the present disclosure.
Figure 4:
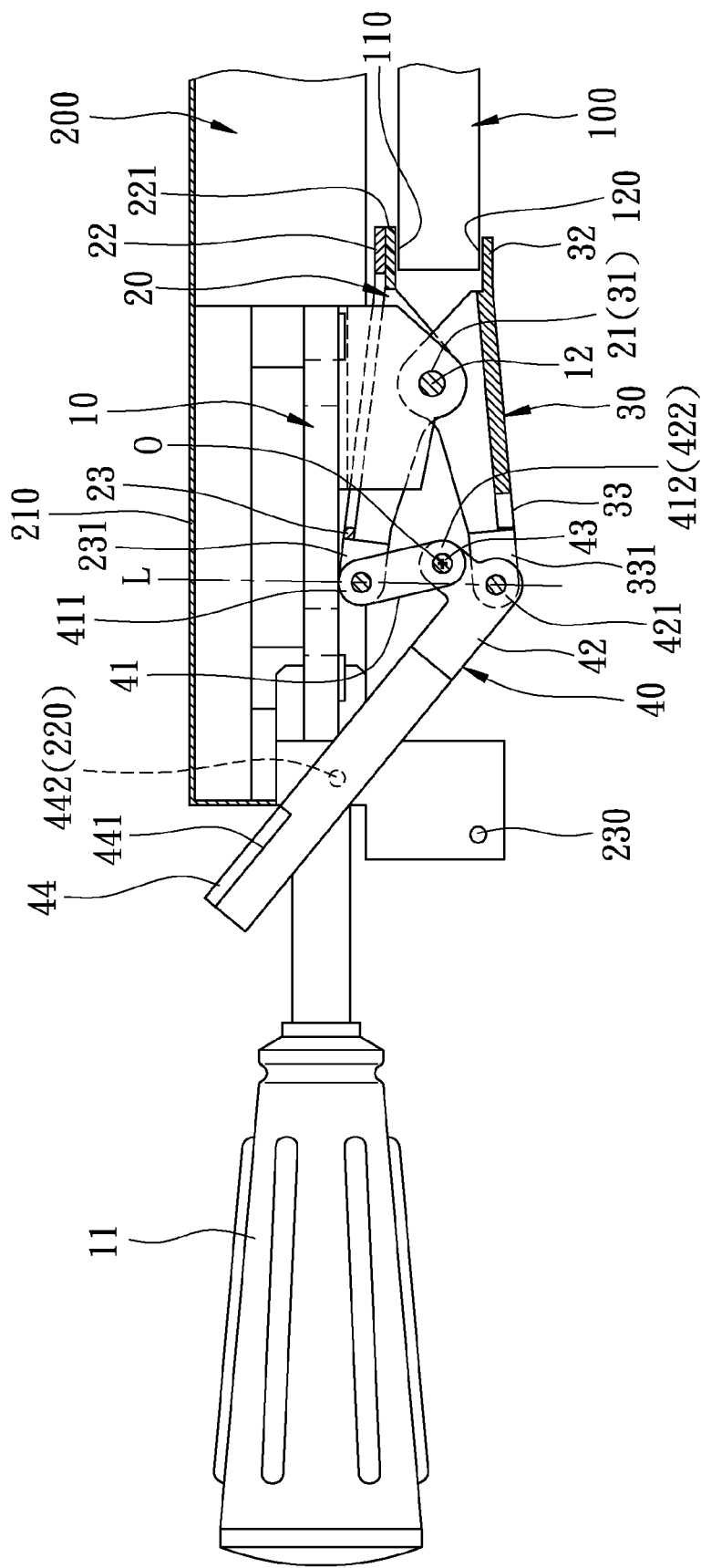
FIG. 4 is an assembled side elevation view of the positioning device for a turnable table of a saw machine in operation in accordance with the first embodiment of the present disclosure, wherein a first clench member and a second clench member are shown unclenching a top and bottom surface of a base, respectively.

Referring to FIGS. 2-4, a preferred embodiment of the positioning device for a turnable table 200 of saw machine in accordance with the present disclosure includes a saw machine which comprises a base 100, a turnable table 200 which is rotatably disposed on the base 100, and a cutting unit 300 which is disposed on the turnable table 200. The base 100 has a top surface 110 and a bottom surface 120. A longitudinal shaft 210 outwardly extends from the turnable table 200, the longitudinal shaft 210 has a first positioning hole 220 and a second positioning hole 230 defined therein. The second positioning hole 230 is located below the first positioning hole 220.

The positioning device comprises a stationary member 10 which is mounted to a bottom of the longitudinal shaft 210, a first clamping unit 20 and a second clamping unit 30 are pivotally mounted to the stationery member 10, a coupling unit 40 is interposed between the first clamping unit 20 and the second clamping unit 30.

The stationary member 10 includes a knob 11 outwardly extending therefrom and a pivot shaft 12 for pivotally coupling the first clamping unit 20 and the second clamping unit 30. The pivot shaft 12 is located proximate to the turnable table 200 compared to that of the knob 11. The knob 11 is adapted for driving the turnable table 200 to rotate relative to the base 100.

The first clamping unit 20 has a first pivot portion 21 formed thereon for pivotally coupling with the pivot shaft 12; a first pressing member 23 and a first clench member 22 oppositely extend from the first pivot portion 21. The first pressing member 23 has a pair of first pivot ears 231 extending therefrom. The first clench member 22 corresponds to the top surface 110 of the base 100 for clamping/unclamping the top surface 110 of the base 100. A buffer pad 221 can be attached to a bottom surface of the first clench member 22 for preventing the first clenching member from leaving a pressure mark on the top surface 110 of the base 100 when the first clenching member is clamped to the top surface 110 of the base 100.

The second clamping unit 30 has a second pivot portion 31 formed thereon for pivotally coupling with the pivot shaft 12 such that the first clamping unit 20 and the second clamping unit 30 are pivotally connected via the pivot shaft 12. A second pressing member 33 and a second clench member 32 oppositely extend from the second pivot portion 31. The second pressing member 33 has a pair of second pivot ears 331 extending therefrom. The second clench member 32 corresponds to the bottom surface 120 of the base 100 for clamping/unclamping the bottom surface 120 of the base 100.

The coupling unit 40 includes a first coupling member 41, a second coupling member 42, a trigger 44 which is integrally coupled to the second coupling member 42, and a pin member 43 for pivotally interconnecting the first coupling member 41 to the second coupling member 42. The first coupling member 41 has a first pivot opening 411 defined therein for correspondingly and pivotally engaging with the first pivot ears 231 of the first pressing member 23 and a linkage portion 412 formed thereon and oppositely located relative to the first pivot opening 411. The second coupling member 42 has a second pivot opening 421 defined therein for correspondingly and pivotally engaging with the second pivot ears 331 of the second pressing member 33 and a connecting portion 422 formed thereon.

The connecting portion 422 is coaxially aligned with the linkage portion 412. Axes of the first pivot opening 411 and the second pivot opening 421 define an imaginary line (L) therebetween. In the present embodiment, the connecting portion 422 and the linkage portion 412 are openings. The pin member 43 passes through the linkage portion 412 and the connecting portion 422 such that the first coupling member 41 and the second coupling member 42 are pivotally rotatable relative to the pin member 43. The trigger 44 has an actuating portion 441 and a positioning protrusion 442 formed thereon. The positioning protrusion 442 is located adjacent to the actuating portion 441.

The operation of the present disclosure will be described in detail below. Referring to FIGS. 2 and 4, when the trigger 44 of the coupling unit 40 is pulled up by pushing up the actuating portion 441, the first pressing member 23 of the first clamping unit 20 and the second pressing member 33 of the second clamping unit 30 are drawn toward each other. The first clench member 22 and the second clench member 32 are then relatively drawn away from each other by pivotally driving the first pressing member 23 and the second pressing member 33 to relatively drawn away from each other such that the first clench member 22 and the second clench member 32 unclamp the top surface 110 and bottom surface 120 of the base 100, respectively.

Further, the positioning protrusion 442 is positioned in the first positioning hole 220 for maintaining the trigger 44 in the pulled-up position. At this point, the pin member 43 is pivotally driven by the trigger 44, such that an axis (O) of the pin member 43 is biased toward the pivot shaft 12, and the pin member 43 is relatively closer to the pivot shaft 12 compared to that of the imaginary line (L) (as shown in FIG. 4). Thereby, a user can easily rotate the turnable table 200 relative to the base 100 via the knob 11 for adjusting the turnable table 200 to a desired cutting angle.

Figure 5:
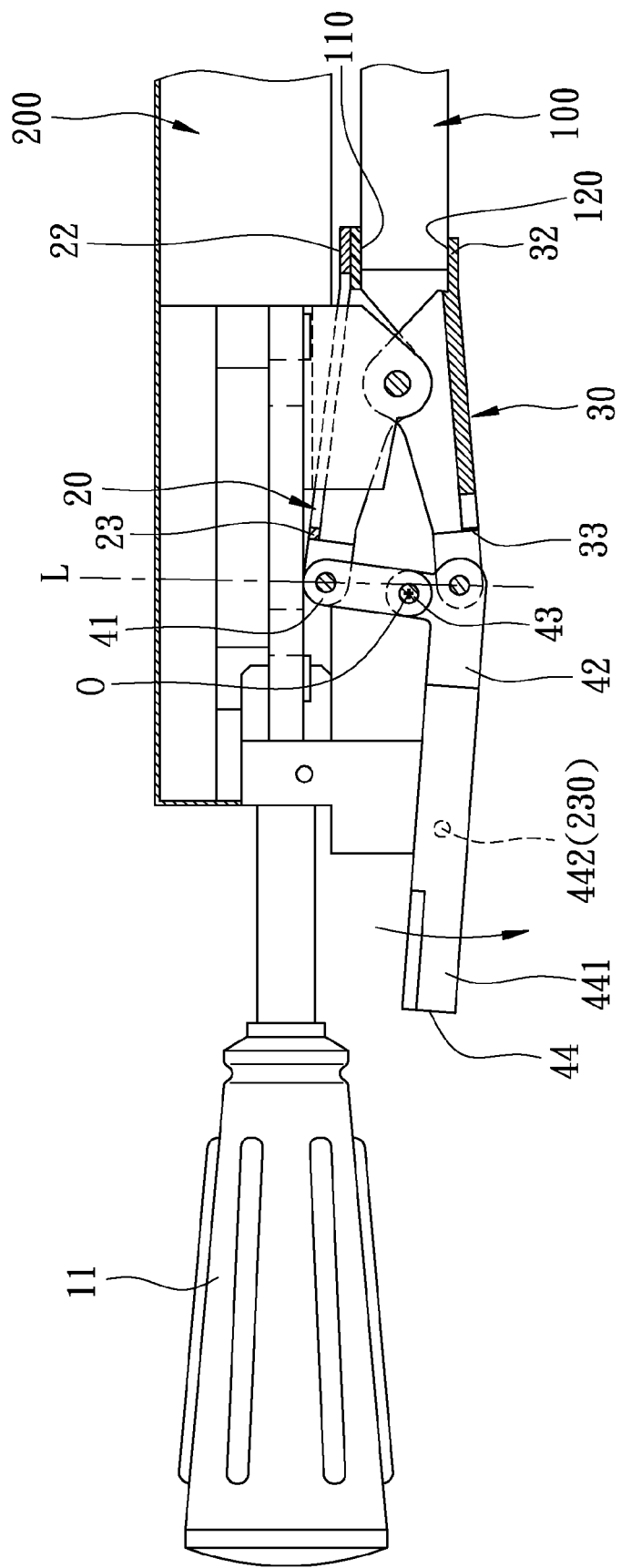
FIG. 5 is an assembled side elevation view of the positioning device for a turnable table of a saw machine in operation in accordance with the first embodiment of the present disclosure, wherein the first clench member and the second clench member are shown clenching a top and bottom surface of a base, respectively.

Further referring to FIG. 5, when the turnable table 200 is rotated to the desired cutting angle, the user can pull down the trigger 44 of the coupling unit 40 by pressing down on the actuating portion 441 of the trigger 44 so that the first pressing member 23 and the second pressing member 33 are drawn away from each other. This causes the first clench member 22 and the second clench member 32 to be pivotally driven by the first pressing member 23 and the second pressing member 33, respectively, so that they are drawn relative toward each other. The first clench member 22 and the second clench member 32 then respectively clamp the top surface 110 and the bottom surface 120 of the base 100.

The pin member 43 is pivotally driven by the trigger 44, such that the axis (O) of the pin member 43 is biased away from the pivot shaft 12, and the pin member 43 is located farther from the pivot shaft 12 compared to that of the imaginary line (L) (as shown in FIG. 5). The positioning protrusion 442 of the trigger 44 is correspondingly positioned in the second positioning hole 230 for maintaining the trigger 44 in the pulled-down position. Thereby, the first clench member 22 and the second clench member 32 are securely clamped to the top surface 110 and the bottom surface 120 of the base 100 such that the turnable table 200 is securely positioned relative to the base 100. When the user intends to once again adjust the cutting angle, he/she simply needs to pull up the trigger 44 by pushing up the actuating portion 441 as previously described, and as shown in FIGS. 2 and 4.

By manipulating the trigger 44, the first pressing member 23 and the second pressing member 33 are drawn toward/away from each other for pivotally driving the first clench member 22 and the second clench member 32 to respectively clamp/unclamp the top surface 110 and bottom surface 120 of the base 100. Therefore, by utilizing the positioning unit in accordance with the present disclosure, with simple and effortless operation, the first clenching member 22 and the second clenching member 32 clamp/unclamp the top surface 110 and bottom surface 120 of the base 100, the turnable table 200 can be firmly positioned relative to the base 100 without leaving undesirable scratch marks or causing deformation to the base 100 plate.

Figure 6:
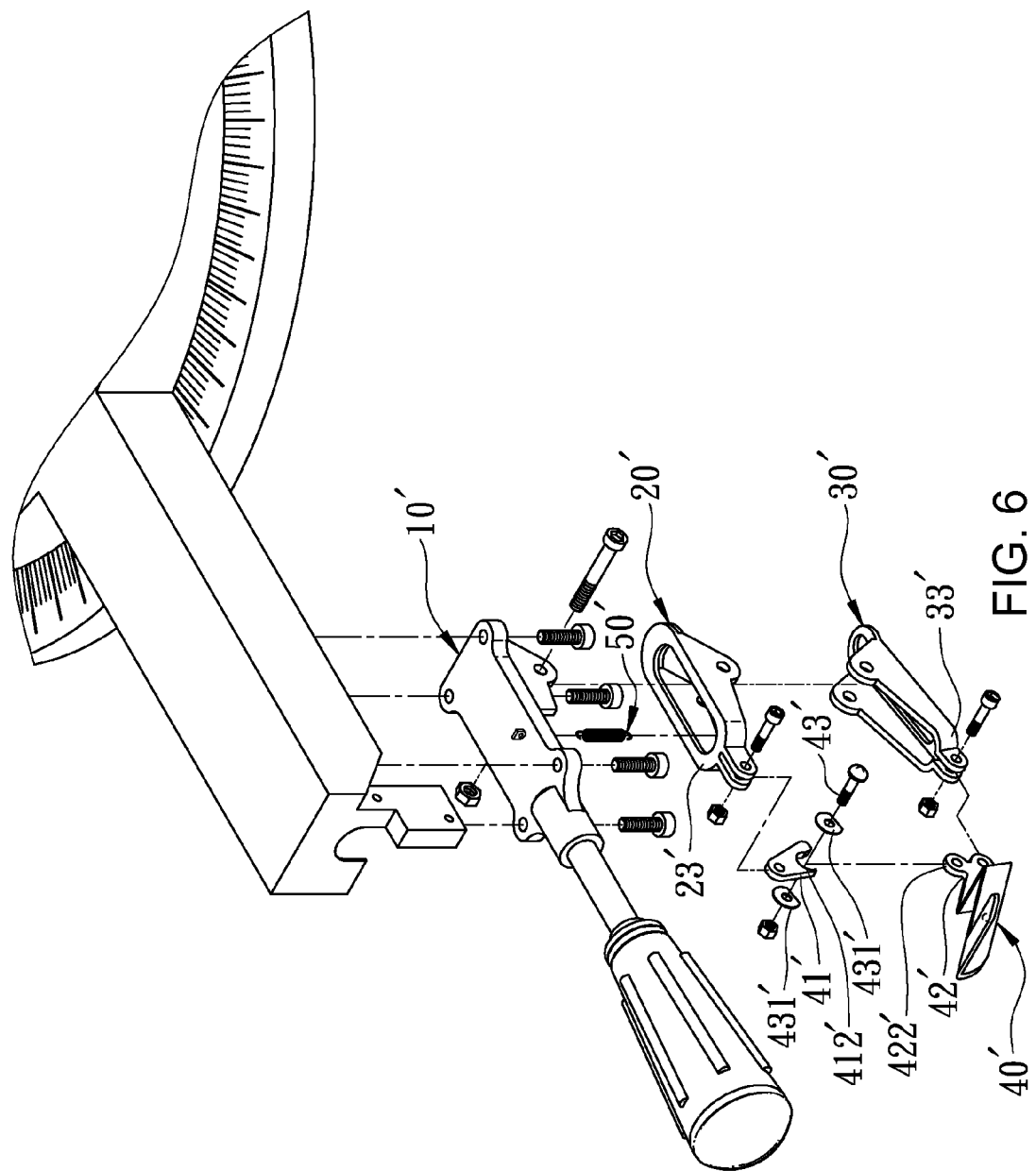
FIG. 6 is an exploded perspective view of the positioning device for a turnable table of a saw machine in accordance with a second embodiment of the present disclosure.
Figure 7:
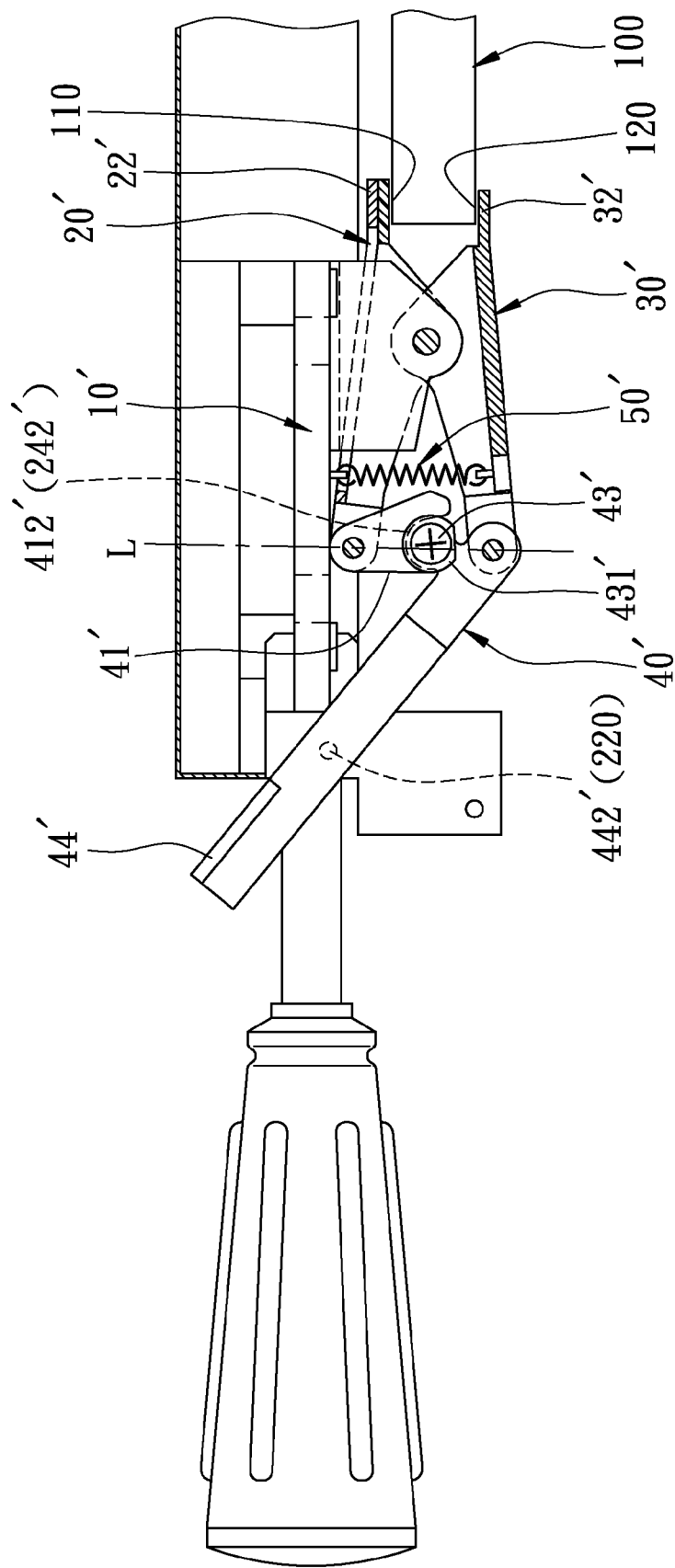
FIG. 7 is an assembled side elevation view of the positioning device for a turnable table of a saw machine in operation in accordance with the second embodiment of the present disclosure, wherein the first clenching member and the second clenching member are shown unclenching the top and bottom surface of the base, respectively.

With reference to FIGS. 6-7, a second embodiment of the present invention is shown. The elements and effects of the second embodiment which are the same as the preferred embodiment are not described, and instead only the differences are described. In this embodiment, an elastomeric element 50', such as a compression spring, is elastically disposed between the first pressing member 23' and the second pressing member 33' and is arranged for elastically and resiliently maintaining the first pressing member 23' and the second pressing member 33' oriented toward each other. The linkage portion 412' of the first coupling member 41' is a circular-notch having an engagement portion greater than 180 degrees. The connecting portion 422' of the second coupling member 42 is disc-shaped. Two washers 431' are disposed on the pin member 43 and are respectively located on two lateral sides of the connecting portion 422' such that the connecting portion 422' is sandwiched between the two washers 431'. Each washer 431' has a diameter greater than that of the linkage portion 412' of the first coupling member 41'. The linkage portion 412' and the connecting portion 422' are correspondingly engaged such that the connecting portion 422' is accommodated in the linkage portion 412'. The linkage portion 412' and the connecting portion 422' are also pivotally rotatable relative to the pin member 43'.

As shown in FIG. 7, the first pressing member 23' of the first clamping unit 20' and the second pressing member 33' of the second clamping unit 30' are drawn toward each other. The first clench member 22' and the second clench member 32' are driven by the first pressing member 23' and the second pressing member 33' to relatively draw away from each other such that the first clench member 22' and the second clench member 32' respectively unclamp the top surface 110 and the bottom surface 120 of the base 100. Further, the positioning protrusion 442' is positioned in the first positioning hole 220 for maintaining the trigger 44' in the pulled-up position.

Figure 8:
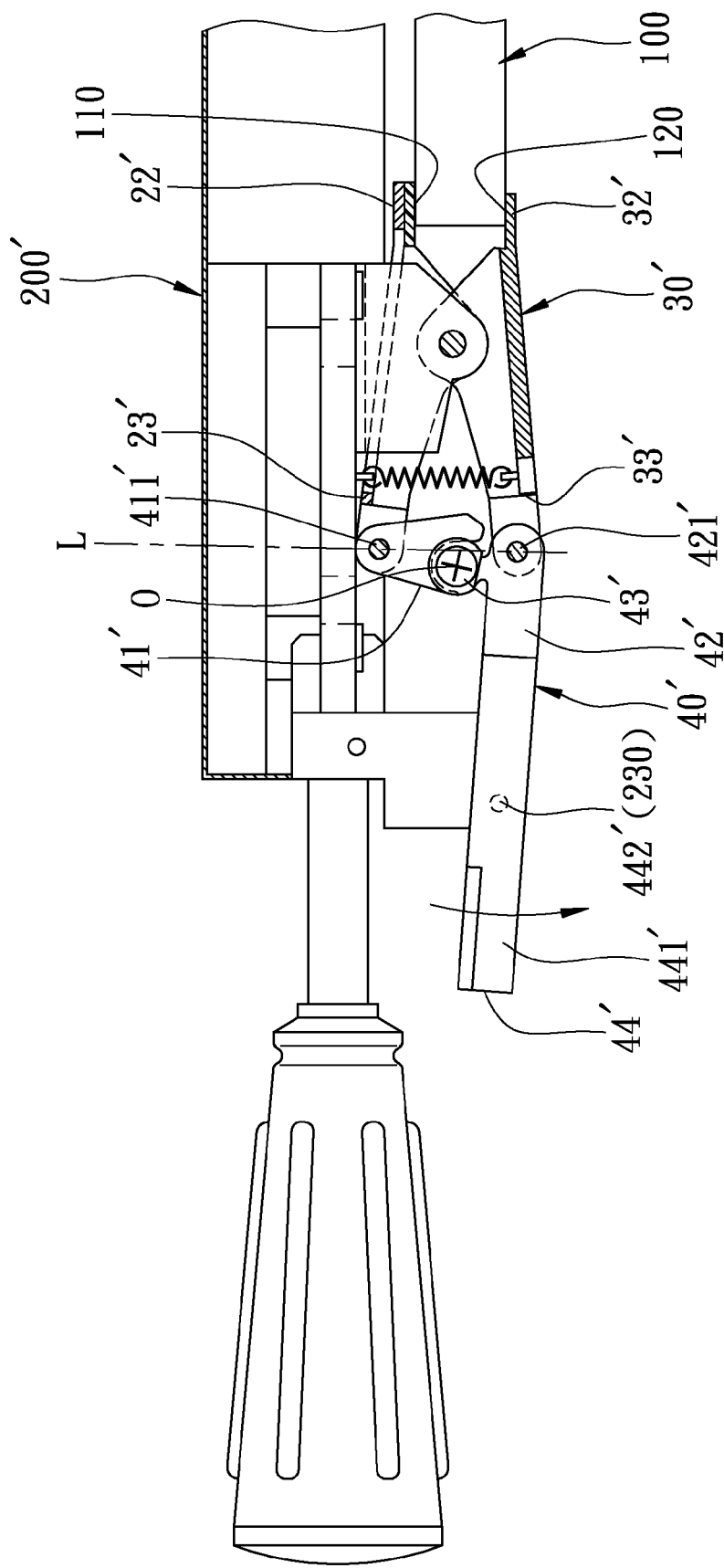
FIG. 8 is an assembled side elevation view of the positioning device for a turnable table of a saw machine in operation in accordance with the second embodiment of the present disclosure, wherein the first clenching member and the second clenching member are shown clenching the top and bottom surface of the base, respectively.
Figure 9:
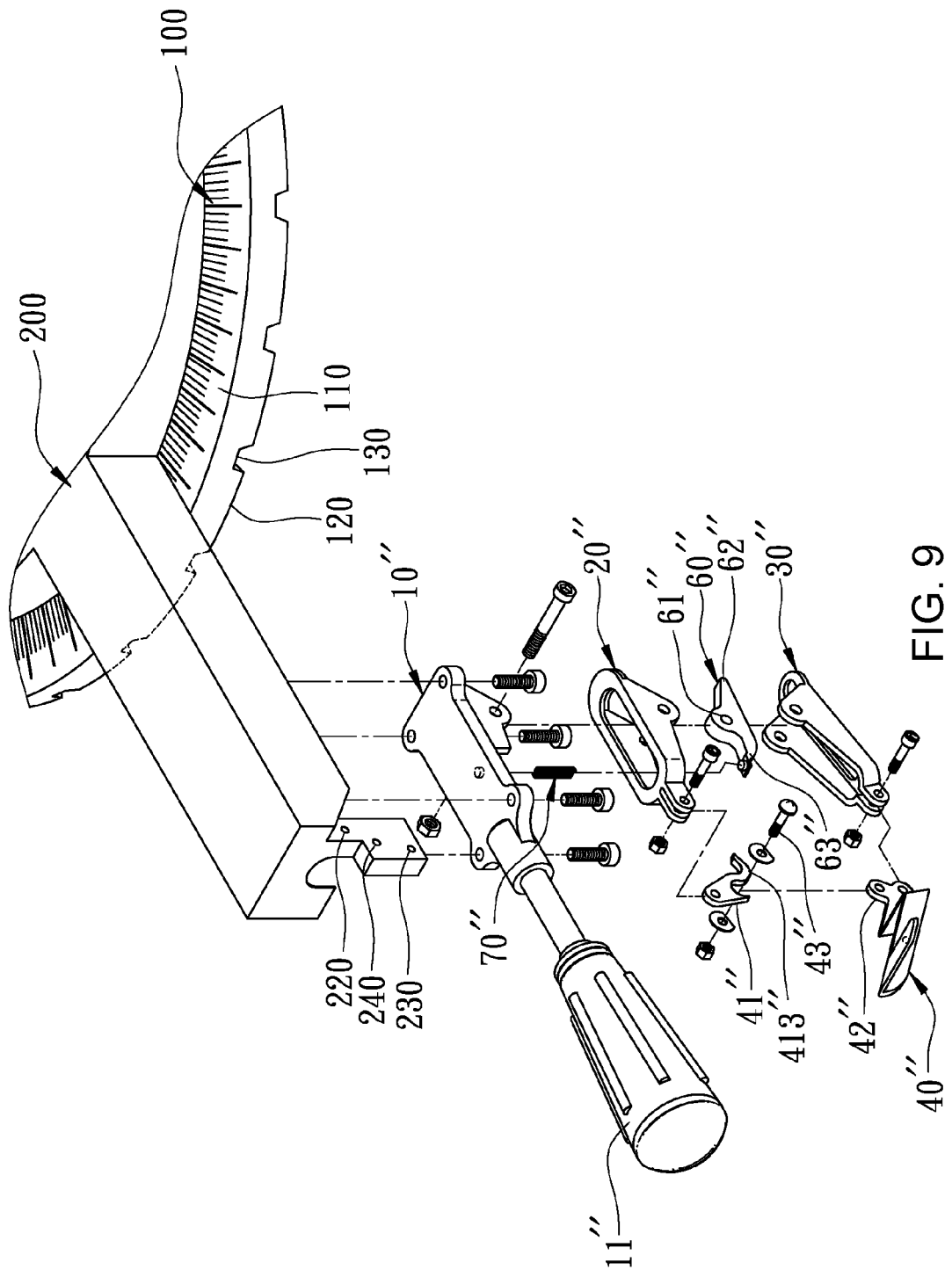
FIG. 9 is an exploded view of the positioning device for a turnable table of a saw machine in accordance with a third embodiment of the present disclosure.

Referring to FIG. 8, by pressing down on the actuating portion 441' to pull down the trigger 44', the first pressing member 23' and the second pressing member 33' are drawn away from each other. The first clench member 22' and the second clench member 32' are then driven by the first pressing member 23' and the second pressing member 33' to be drawn toward each other such that the first clench member 22' and the second clench member 32' clamp the top surface 110 and the bottom surface 120 of the base 100, respectively. The pin member 43' is pivotally driven by the trigger 44', such that the axis (O) of the pin member 43' is biased away from the pivot shaft 12' and the pin member 43' is moved relatively farther away from the pivot shaft 12' compared to that of the imaginary line (L). Further, the positioning protrusion 442' of the trigger 44' is correspondingly positioned in the second positioning hole 230 for maintaining the trigger 44' in the pulled-down position and preventing the first pressing member 23' and the second pressing member 33' from drawing toward each other. The compression spring 50' is expanded and restored for elastic recovery. Thereby, the first clench member 22' and the second clench member 32' are securely clamped to the top surface 110 and bottom surface 120 of the base 100, and the turnable table 200 is positioned relative to the base 100.

By pushing up the actuating portion 441' to pull up the trigger 44' as previously described, the compression spring 50' elastically recovers, such the first coupling unit 40' and the second coupling unit 40' are driven to restore to the configuration as shown in FIG. 7.

With reference to FIGS. 9-12, a third embodiment of the present disclosure is shown. The elements and effects of the third embodiment which are the same as the previous embodiments are not described, and instead only the differences are described. In this embodiment, the base 100 has a plurality of recesses 130 which may be defined at various intervals, such as equally spaced intervals, located along a periphery of the bottom surface 120. A detent member 60" is pivotally interposed between first clamping unit 20" and the second clamping unit 30". A resilient member 70" is disposed on the detent member 60". The longitudinal shaft 210" further has an intermediate positioning hole 240" defined therein which is located between the first positioning hole 220" and the second positioning hole 230".

The detent member 60" has an intermediate portion 61" which is arranged for pivotally connecting with the pivot shaft 12". A detent portion 63" and an inserting portion 62" respectively extend from two opposite lateral ends of the intermediate portion 61". The inserting portion 62" is selectively engageable with any one of the recesses 130.

In the third embodiment, the resilient member 70" is a compression spring which is interposed between the stationary member 10" and the detent portion 63" of the detent member 60" for resiliently urging the inserting portion 62" into engagement with the corresponding recess 130. The first coupling member 41" has an urging member 413" formed thereon and corresponds to the detent portion 63" of the detent member 60". The urging member 413" is substantially hook-shaped.

Figure 10:
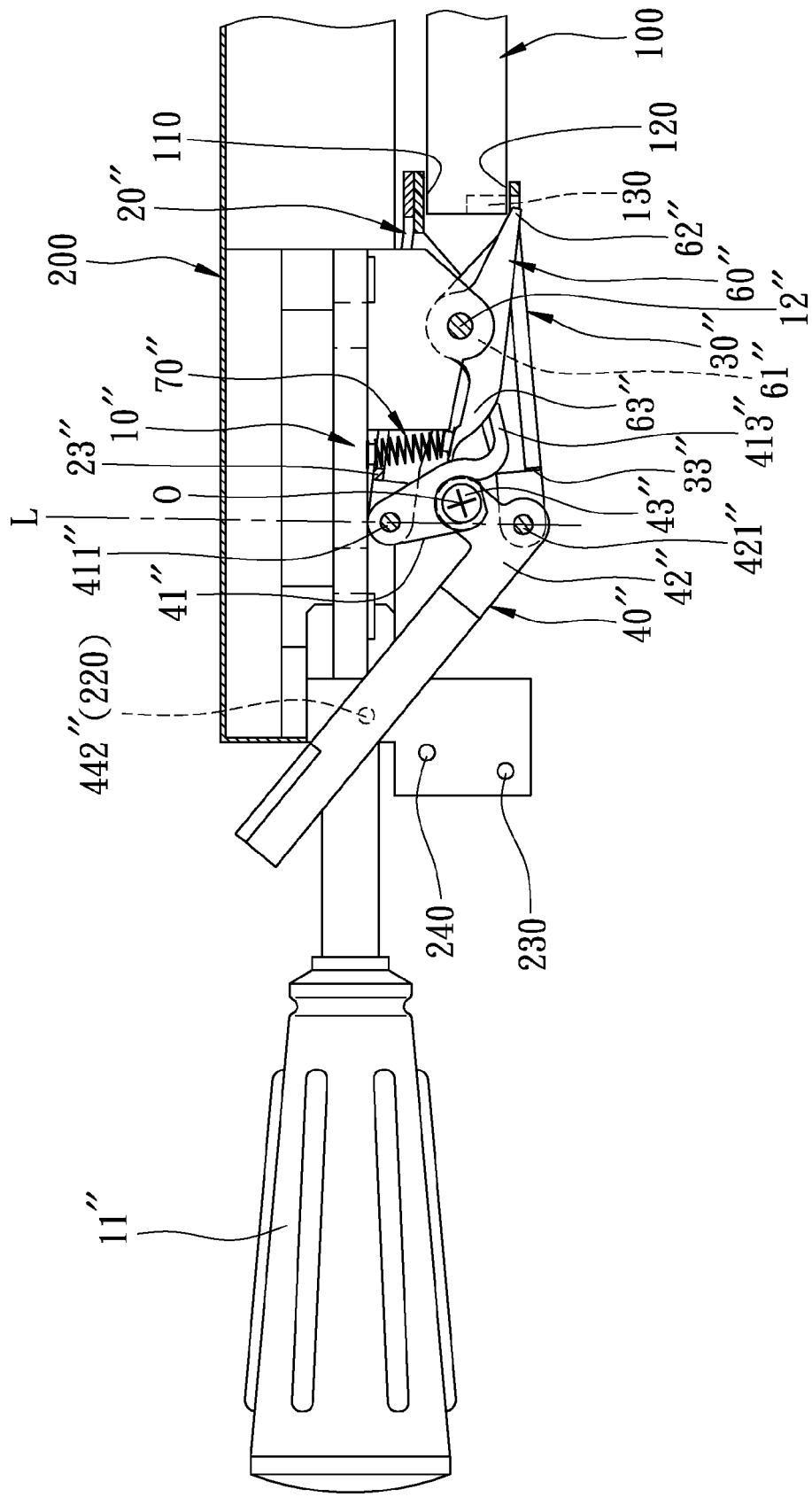
FIG. 10 is an assembled side elevation view of the positioning device for a turnable table of a saw machine in operation in accordance with the third embodiment of the present disclosure, wherein the first clenching member and the second clenching member are shown unclenching the top and bottom surface of the base, respectively.
Figure 11:
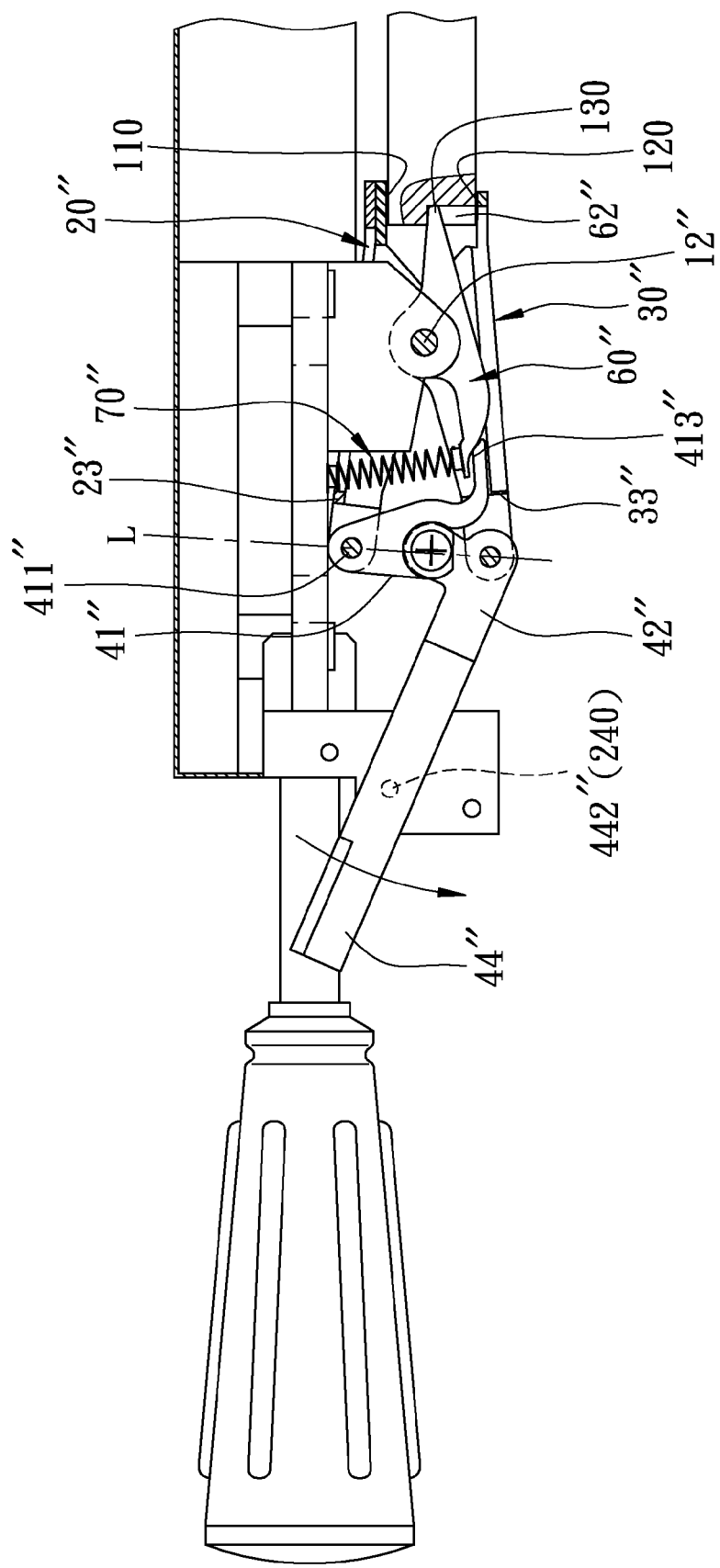
FIG. 11 is an assembled side elevation view of the positioning device for a turnable table of a saw machine in operation in accordance with the third embodiment of the present disclosure, wherein the first clenching member and the second clenching member are shown unclenching the top and bottom surface of the base, respectively, and a detent member is shown engaged in a corresponding recess defined in the bottom surface of the base.

Referring to FIG. 10, when the first pressing member 23" of the first clamping unit 20" and the second pressing member 33" of the second clamping unit 30" are drawn toward each other, the first clench member 22" and the second clench member 32" are driven away from each other such that the first clench member 22" and the second clench member 32" respectively unclamp the top surface 110 and the bottom surface 120 of the base 100. Thus, the user can easily rotate the turnable table 200 relative to the base 100 via the knob 11 for adjusting the turnable table 200 to a desired cutting angle. At this point, the positioning protrusion 442" of the trigger 44" is positioned in the first positioning hole 220. The axis (O) of the pin member 43" is biased toward the pivot shaft 12", and the pin member 43" is located relatively closer to the pivot shaft 12" compared to that of the imaginary line (L). The urging member 413" urges the detent portion 63", such that the detent portion 63" is upwardly pivoted (the compression spring is compressed for restoring elastic recovery) and the inserting portion 62" is refrained from engaging with the recesses 130.

When the turnable table 200 is rotated via the knob 11" to the desired cutting angle, the user must press down on the actuating portion 441" of the trigger 44" so that the positioning protrusion 442" is positioned in the intermediate positioning hole 240. The second coupling member 42" is driven by the trigger 44", and consequently the first coupling member 41" is driven by the second coupling member 42". Thereby the first coupling member 41" is slightly and pivotally rotated. The first pressing member 23" and the second pressing member 33" are slightly oriented away from each other such that the first clench member 22" and the second clench member 32" are oriented toward the top surface 110 and the bottom surface 120 of the base 100, respectively. The detent portion 63" of the detent member 60" is slightly pivoted toward the second press member. The inserting portion 62", is elastically urged by the compression spring 70" such that when any one of the recesses 130 corresponds to the inserting portion 62", the inserting portion 62" becomes elastically engaged with the corresponding recess.

Figure 12:
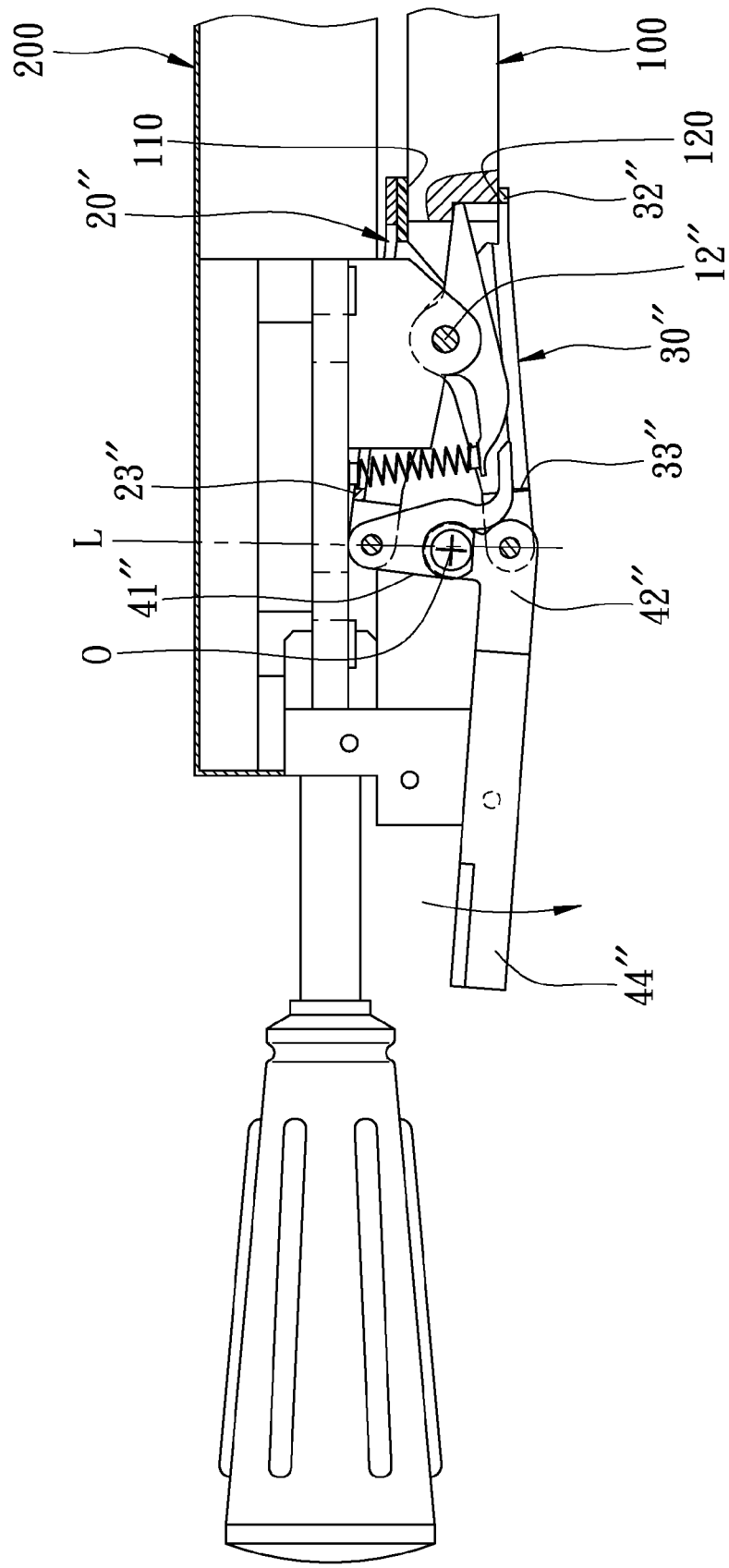
FIG. 12 is an assembled side elevation view of the positioning device for a turnable table of a saw machine in operation in accordance with the third embodiment of the present disclosure; wherein the first clenching member and the second clenching member are shown clenching the top and bottom surface of the base, respectively, and the detent member is shown engaged in the corresponding recess defined in the bottom surface of the base.

Referring to FIG. 12, when the actuating portion 441" of the trigger 44" is continuously pressed down, the positioning protrusion 442" is positioned in the second positioning hole 230 which is located under the intermediate positioning hole 240. When the first pressing member 23" and the second pressing member 33" are drawn away from each other, the first clench member 22" and the second clench member 32" are pivotally drawn toward each other such that the first clench member 22" and the second clench member 32" clamp the top surface 110 and the bottom surface 120 of the base 100, respectively. The pin member 43" is pivotally driven by the trigger 44", such that the axis (O) of the pin member 43" is biased away from the pivot shaft 12", and the pin member 43" is located relatively farther away from the pivot shaft 12" compared to that of the imaginary line (L). Thus, the first clench member 22" and the second clench member 32" are securely clamped to the top surface 110 and bottom surface 120 of the base 100, and the turnable table 200 is positioned relative to the base 100. When the user intends to once again adjust the cutting angle, he/she simply needs to pull up the trigger 44" by pushing the actuating portion 441" up as previously described and as shown in FIG. 10.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:

1. A positioning device for a turnable table of a saw machine, the saw machine including a base defining a top and bottom surface, a turnable table rotatably located on the base, and a cutting unit arranged on the turnable table, said positioning device comprising:
    a pivot shaft mounted to the turnable table;
    a first pressing member coupled to the pivot shaft;
    a second clamping unit forming a second pivot portion for pivotally coupling on the pivot shaft, a second clench member corresponding to the bottom surface of the base, and a second pressing member corresponding to the first pressing member oppositely extending from the second pivot portion relative to the second clench member;
    a coupling unit interposed between the first and second pressing members, the coupling unit having a first coupling member pivotally connected to the first pressing member, a second coupling member for pivotally connecting the first coupling member and the second pressing member, and a trigger coupled to the second coupling member; and
    wherein manipulating the trigger drives the first and second coupling members such that the first and second pressing members are drawn toward or away from each other for pivotally driving the second clench member to unclamp or clamp the base.

2. A saw machine according to claim 1, further comprising a pin member pivotally connecting the first and second coupling members, the first coupling member defining a first pivot opening for engaging the first pressing member, the second coupling member defining a second pivot opening for engaging the second pressing member, and axes of the first and second pivot openings defining an imaginary line therebetween; and
    wherein the pin member is pivotally driven such that its axis is biased toward the pivot shaft and shifted relatively closer to the pivot shaft compared to that of the imaginary line when the first and second pressing members are drawn toward each other, the axis of the pin member biased away from the pivot shaft and shifted relatively farther from the pivot shaft compared to that of the imaginary line when the first and second pressing members are drawn away from each other.

3. A saw machine according to claim 2, the first coupling member further forming a linkage portion and oppositely located from the first pivot opening, and the second coupling member forming a connecting portion and oppositely located from the second pivot opening, so that the connecting portion is coaxially aligned with the linkage portion, and wherein the pin member passes through both the linkage portion and the connecting portion such that the first and second coupling members are coaxially aligned and pivotally rotatable about the pin member.

4. A saw machine according to claim 3, wherein the linkage portion of the first coupling member comprises a substantially circular-shaped notch.

5. A saw machine according to claim 4, wherein the connecting portion of the second coupling member is substantially disc-shaped.

6. A saw machine according to claim 5, further comprising a pair of washers arranged on the pin member, each washer having a diameter greater than that of the linkage portion of the first coupling member, and wherein each washer is respectively located on an opposite lateral side of the connecting portion so that the connecting portion is sandwiched between each washer.

7. A saw machine according to claim 1, further comprising a first clamping unit corresponding to the second clamping unit and having a first pivot portion formed thereon for pivotally coupling with the pivot shaft so that the first and second clamping units are pivotally connected by the pivot shaft, and a first clench member extending from the first pivot portion for corresponding to the top surface of the base, wherein the first pressing element oppositely extends from the first pivot portion relative to the first clench member.

8. A saw machine according to claim 7, further comprising a longitudinal shaft extending from the turnable table and having a first positioning hole defined therein.

9. A saw machine according to claim 8, the trigger of the coupling unit further comprising an actuating portion and a positioning protrusion formed thereon such that the positioning protrusion is located adjacent to the actuating portion for selectively engaging with the first positioning hole, wherein the positioning protrusion of the coupling unit is correspondingly positioned in the first positioning hole when the first and the second clench members unclamp the respective top and bottom surface of the base.

10. A saw machine as claimed in claim 9, wherein the longitudinal shaft defines a second positioning hole and is located adjacent to the first positioning hole such that the positioning protrusion of the trigger is correspondingly positioned in the second positioning hole when the first and second clench members clamp the respective top and bottom surface of the base.

11. A saw machine according to claim 7, the first coupling member further having a linkage portion formed thereon and oppositely located from the first pivot opening, and the second coupling member having a connecting portion formed thereon and oppositely located from the second pivot opening so that the connecting portion is coaxially aligned with the linkage portion, and wherein the pin member passes through both the linkage portion and the connecting portion such that the first and second coupling members are coaxially aligned and pivotally rotatable about the pin member.

12. A saw machine as claimed in claim 11, further comprising a detent member pivotally interposed between the first and second clamping units, and having a detent portion and an inserting portion respectively formed on two opposite ends, wherein the inserting portion is selectively engageable with any one of a plurality of recesses defined at intervals along a periphery of the bottom surface of the base.

13. A saw machine according to claim 12, further comprising a resilient member adapted to engage the detent portion for resiliently urging the inserting portion into engagement with one of the plurality of recesses.

14. A saw machine according to claim 13, wherein the resilient member is a compression spring.

15. A saw machine according to claim 13, further comprising an urging member corresponding to the detent portion and formed on the first coupling member such that the urging member urges the detent portion to prevent the inserting portion from engaging with a corresponding recess when the first and second clench members are in an unclamped position.

16. A saw machine as claimed in claim 15, further comprising a longitudinal shaft extending from the turnable table and having a first and second positioning hole defined therein such that the second positioning hole is located below the first positioning hole, an intermediate positioning hole formed on the longitudinal shaft between the first and second positioning holes, an actuating portion and a positioning protrusion formed adjacent to each other on the trigger of the coupling unit, wherein the positioning protrusion of the trigger engages the first positioning hole when the first and second clench members unclamp the base, the positioning protrusion of the trigger engages the second positioning hole when the first and second clench members clamp the base, and the inserting portion of the detent member engages a corresponding recess of the base when the positioning protrusion engages the intermediate positioning hole.

17. A saw machine according to claim 1, further comprising an elastomeric element located between the first and second pressing members for elastically and resiliently maintaining the orientation of the first and second pressing members toward each other.

18. A saw machine according to claim 17, wherein the elastomeric element is a compression spring.

19. A saw machine, the saw machine including a positioning device, base defining a top and a bottom surface, a turnable table rotatably located on the base, and a cutting unit arranged on the turnable table, said positioning device comprising:
   a pivot shaft mounted to the turnable table;
   a first clamping unit having a first pivot portion formed thereon for pivotally coupling with the pivot shaft, a first clench member extending from an end of the first pivot portion and corresponding to the top surface of the base, a first pressing member extending from an opposite end of the first pivot portion, and a pair of first pivot ears extending from the first pressing member;
   a second clamping unit having a second pivot portion formed thereon for pivotally coupling with the pivot shaft, a second clench member extending from an end of the second pivot portion and corresponding to the bottom surface of the base, a second pressing member corresponding to the first pressing member and extending from an opposite end of the second pivot portion, and a pair of second pivot ears extending from the second pressing member;
   a coupling unit interposed between the first and second pressing members, the coupling unit having a first coupling member pivotally connected to the first pressing member, and a second coupling member for pivotally connecting the first coupling member and the second pressing member; and
   the first coupling member having a first pivot opening for pivotally engaging the first pivot ears, and the second coupling member having a second pivot opening for pivotally engaging the second pivot ears.

20. A saw machine, the saw machine including a positioning device, base defining a top and a bottom surface, a turnable table rotatably located on the base, and a cutting unit arranged on the turnable table, said positioning device comprising:
- a longitudinal shaft extending from the turnable table;
- a stationary member mounted to the longitudinal shaft and having a knob for driving the turnable table relative to the base;
- a pivot shaft mounted to the turnable table;
- a first clamping unit having a first pivot portion formed thereon for pivotally coupling with the pivot shaft, a first clench member extending from a side of the first pivot portion and corresponding to the top surface of the base, and a first pressing member extending from an opposite side of the first pivot portion;
- a second clamping unit having a second pivot portion formed thereon for pivotally coupling with the pivot shaft, a second clench member extending from a side of the second pivot portion and corresponding to the bottom surface of the base, and a second pressing member corresponding to the first pressing member and extending from an opposite side of the second pivot portion;
- a coupling unit interposed between the first and second pressing members, the coupling unit having a first coupling member pivotally connected to the first pressing member, and a second coupling member for pivotally connecting the first coupling member and the second pressing member; and
- wherein the first and second clamping units are pivotally mounted to the stationary member and the coupling unit is interposed between the first and second clamping units.

* * * * *